US012780298B2

(12) United States Patent
Poonawala et al.

(10) Patent No.: US 12,780,298 B2
(45) Date of Patent: Nov. 3, 2026

(54) SYSTEMS FOR A STEERING CYLINDER

(71) Applicant: DANA ITALIA S.R.L., Arco (IT)

(72) Inventors: Idris Poonawala, Pune (IN); Pradip Jasud, Pune (IN); Paresh Joshi, Pune (IN)

(73) Assignee: DANA ITALIA S.R.L., Arco (IT)

( * ) Notice: Subject to any disclaimer, the term of this patent is extended or adjusted under 35 U.S.C. 154(b) by 527 days.

(21) Appl. No.: 18/340,518

(22) Filed: Jun. 23, 2023

(65) Prior Publication Data

US 2024/0425105 A1 Dec. 26, 2024

(51) Int. Cl.
*B62D 5/12* (2006.01)

(52) U.S. Cl.
CPC .................................... *B62D 5/12* (2013.01)

(58) Field of Classification Search
CPC .... B62D 5/12; B62D 5/18; B62D 7/18; B66F 9/07568
See application file for complete search history.

(56) References Cited

U.S. PATENT DOCUMENTS

| | | | | |
|---|---|---|---|---|
| 6,854,552 | B2 | 2/2005 | Yurushi | |
| 2007/0029748 | A1 | 2/2007 | Baxter et al. | |
| 2015/0158522 | A1* | 6/2015 | Thayer | B66F 9/24 701/41 |
| 2020/0378411 | A1* | 12/2020 | Luc | F15B 15/1457 |
| 2022/0290732 | A1* | 9/2022 | Dong | F16F 9/58 |
| 2022/0307870 | A1 | 9/2022 | Maglione et al. | |

FOREIGN PATENT DOCUMENTS

| | | | | | |
|---|---|---|---|---|---|
| CN | 106794866 | A | * | 5/2017 | B62D 15/0215 |
| CN | 107985392 | A | * | 5/2018 | B66F 9/07568 |
| CN | 108688720 | A | * | 10/2018 | B60B 35/003 |
| CN | 106891993 | B | * | 2/2023 | B62D 5/18 |
| EP | 0872405 | A2 | * | 10/1998 | B62D 6/002 |
| EP | 3061672 | A1 | | 8/2016 | |
| KR | 101852544 | B1 | | 4/2018 | |
| WO | WO-0071459 | A1 | * | 11/2000 | B62D 7/1509 |
| WO | WO-2014096893 | A1 | * | 6/2014 | B62D 5/12 |

* cited by examiner

*Primary Examiner* — Bobby Rushing, Jr.
(74) *Attorney, Agent, or Firm* — McCoy Russell LLP

(57) ABSTRACT

Systems are provided for a steering system. In one example, a steering system includes a hydraulic cylinder configured to adjust a steering angle of wheels coupled to an axle, and a pair of hydraulic ports, each including an inboard section in sealing engagement with an outer circumference of a cylinder tube.

19 Claims, 10 Drawing Sheets

SYSTEMS FOR A STEERING CYLINDER

TECHNICAL FIELD

The present description relates generally to a steering cylinder of a vehicle.

BACKGROUND AND SUMMARY

Vehicles may include a driveline with a power source, a transmission, and a drive axle. Vehicles, and in one example off-highway vehicles, may include a steering column for controlling a pair of wheels of the vehicle.

Some example off-highway vehicles may include a steering cylinder with hydraulic ports for admitting hydraulic fluid into a hydraulic chamber of a cylinder tube of the steering cylinder. Certain designs may reduce a turning magnitude and/or a turning radius of the vehicle due to the positions of the ports and/or hoses extending therefrom that may interfere with rotating wheels. There is a demand for an improved system that modifies the steering cylinder design.

In one example, the issues described above may be at least partially solved by a steering system including a hydraulic cylinder configured to adjust a steering angle of wheels coupled to an axle, and a pair of hydraulic port, each including an inboard section in sealing engagement with an outer circumference of a cylinder tube.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the present disclosure, will become readily apparent to those skilled in the art from the following detailed description when considered in light of the accompanying drawings in which.

DETAILED DESCRIPTION

Figure 1:
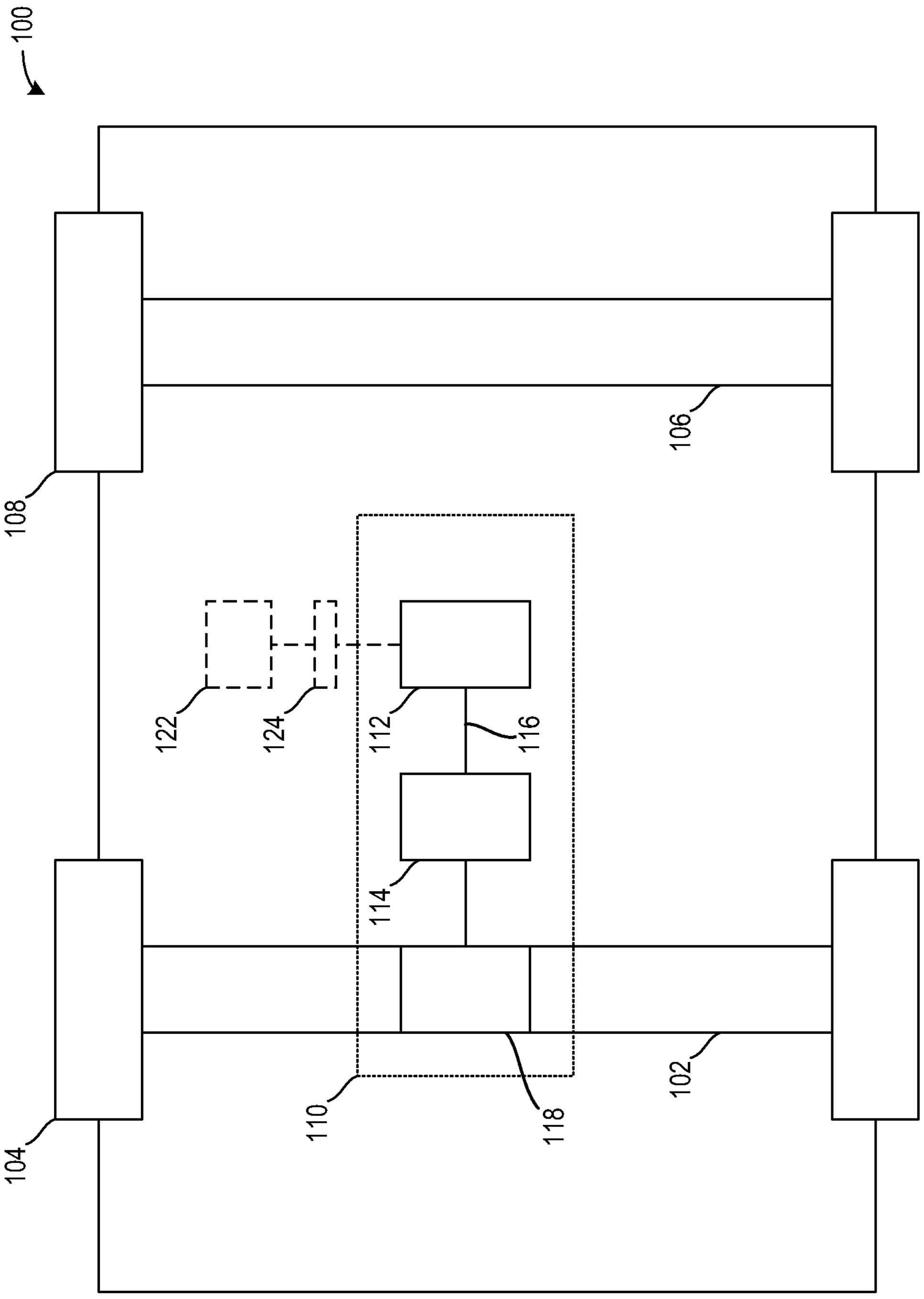
FIG. 1 is an example of a vehicle, according to an embodiment of the present disclosure.
Figure 2:
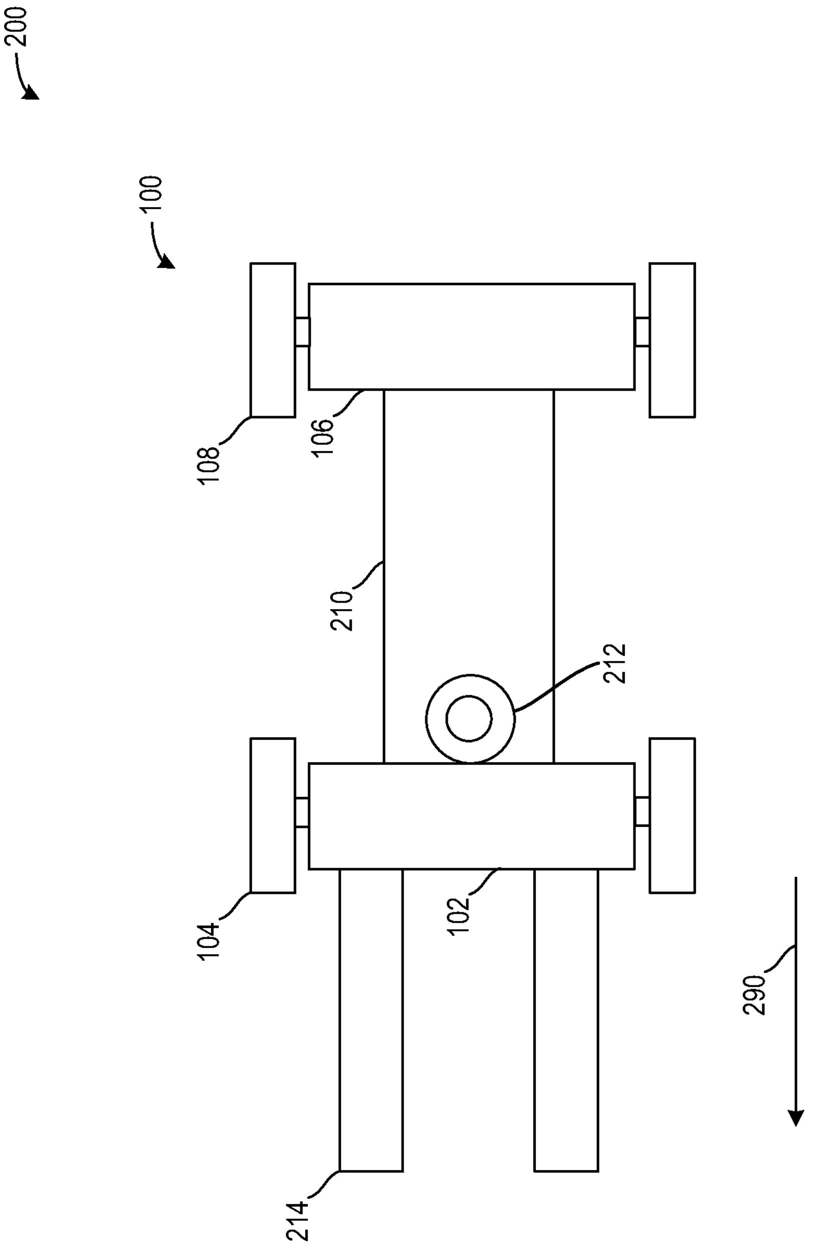
FIG. 2 is an example of an off-highway vehicle, according to an embodiment of the present disclosure.
Figure 3B:
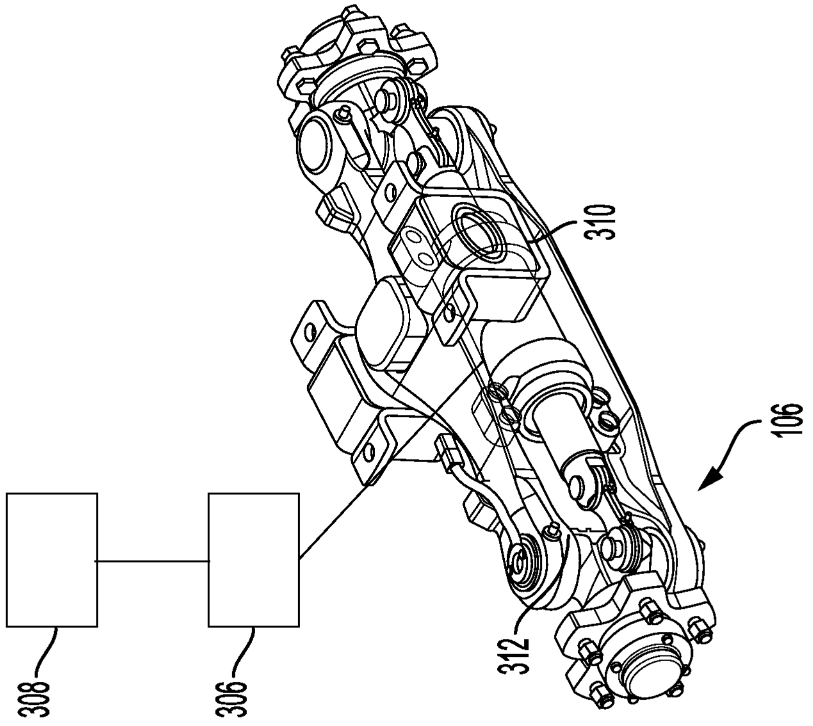
FIG. 3B is a detailed example of a steering cylinder of the steering system of the off-highway vehicle, according to an embodiment of the present disclosure.
Figure 3A:
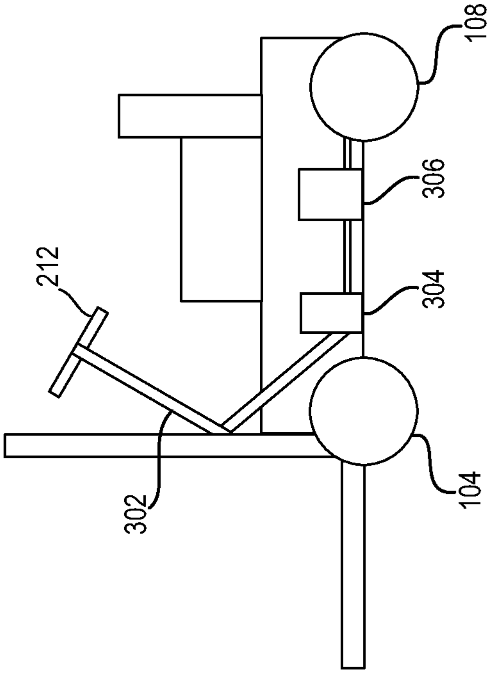
FIG. 3A is an example of a steering column of a steering system of the off-highway vehicle, according to an embodiment of the present disclosure.
Figure 5A:
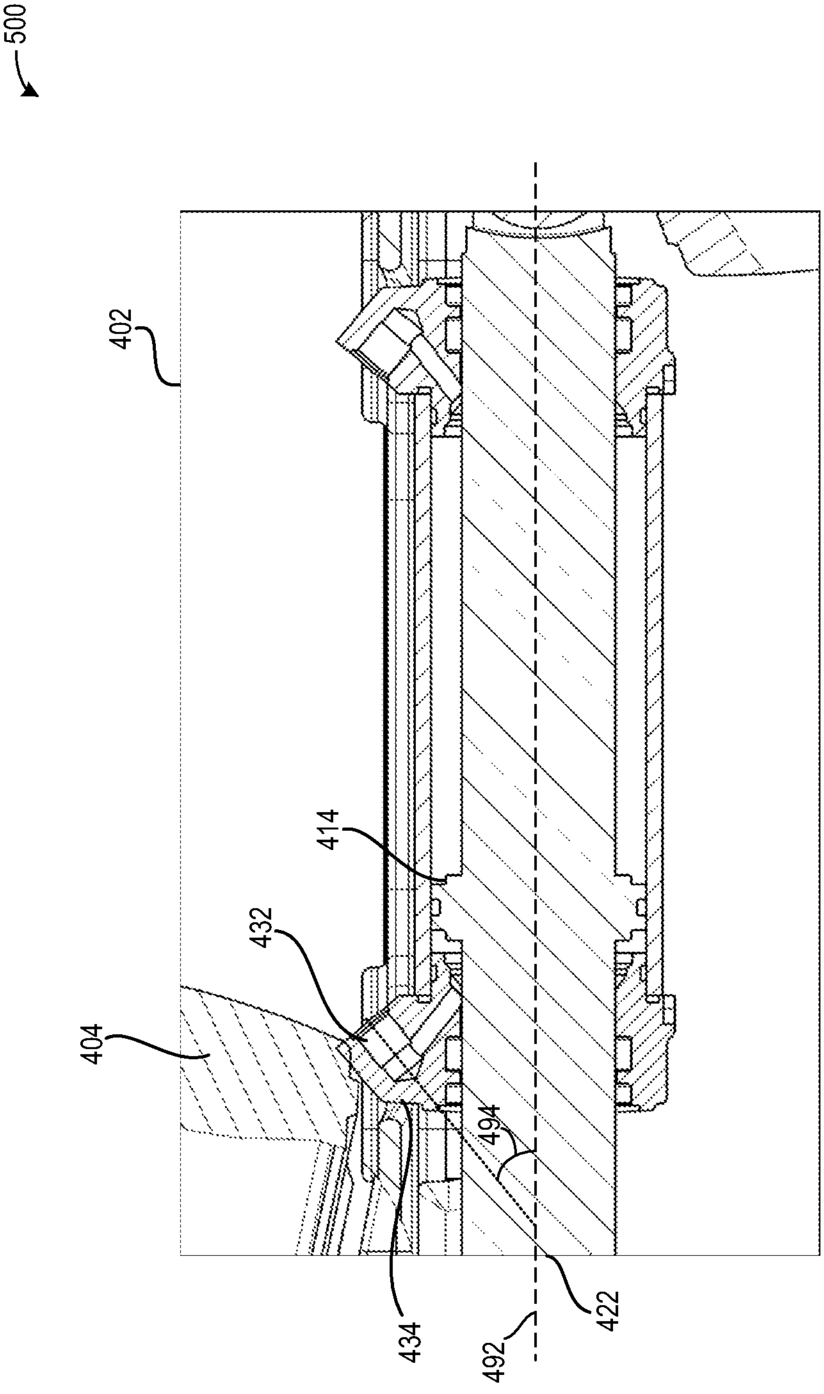
FIG. 5A (Prior art)
FIGS. 5A and 5B are prior art examples of a wheel interfering with a port of the steering cylinder and a hydraulic hose.
Figure 5B:
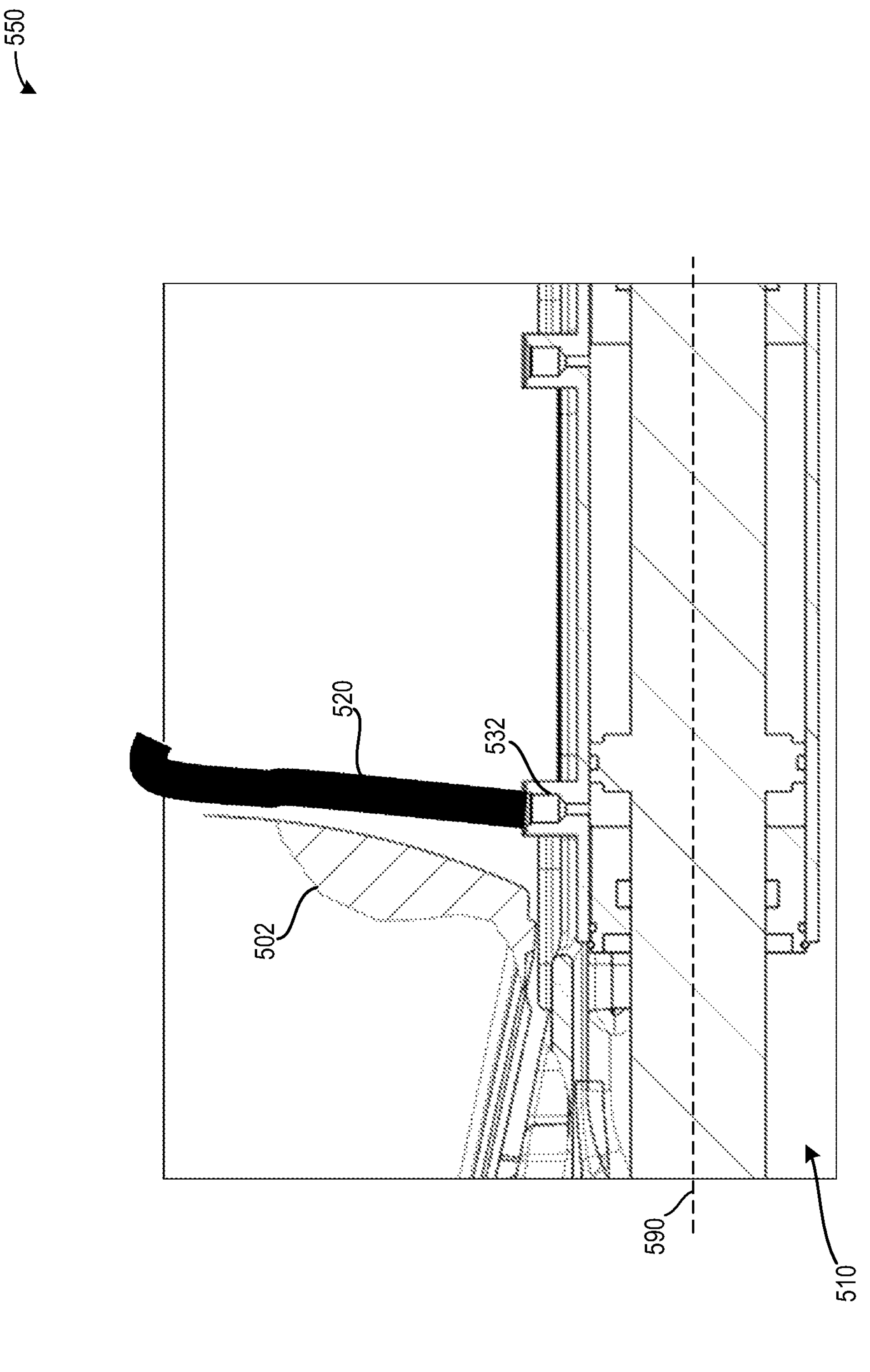
(Prior art) FIG. 5B
Figure 6:
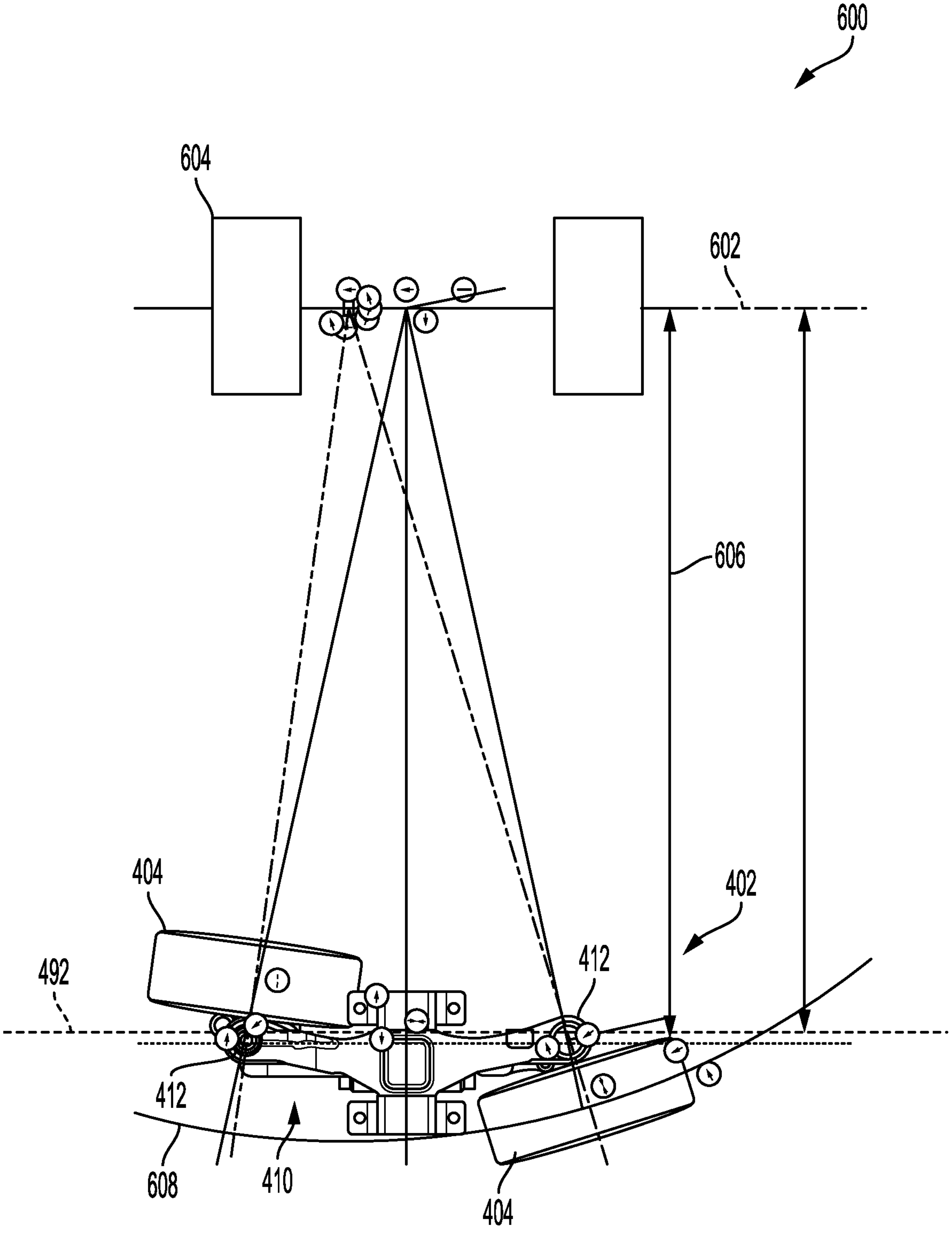
FIG. 6 is an example of a turning radius of the prior art example of a vehicle including the system of FIGS. 5A and 5B.
Figure 7A:
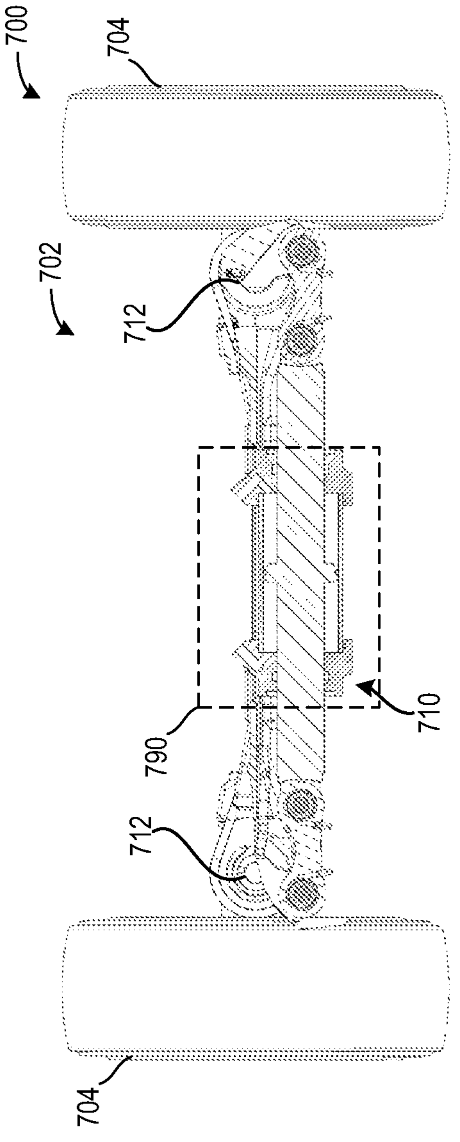
FIGS. 7A and 7B are an example of a pair of ports of a steering cycling, according to an embodiment of the present disclosure.
Figure 7B:
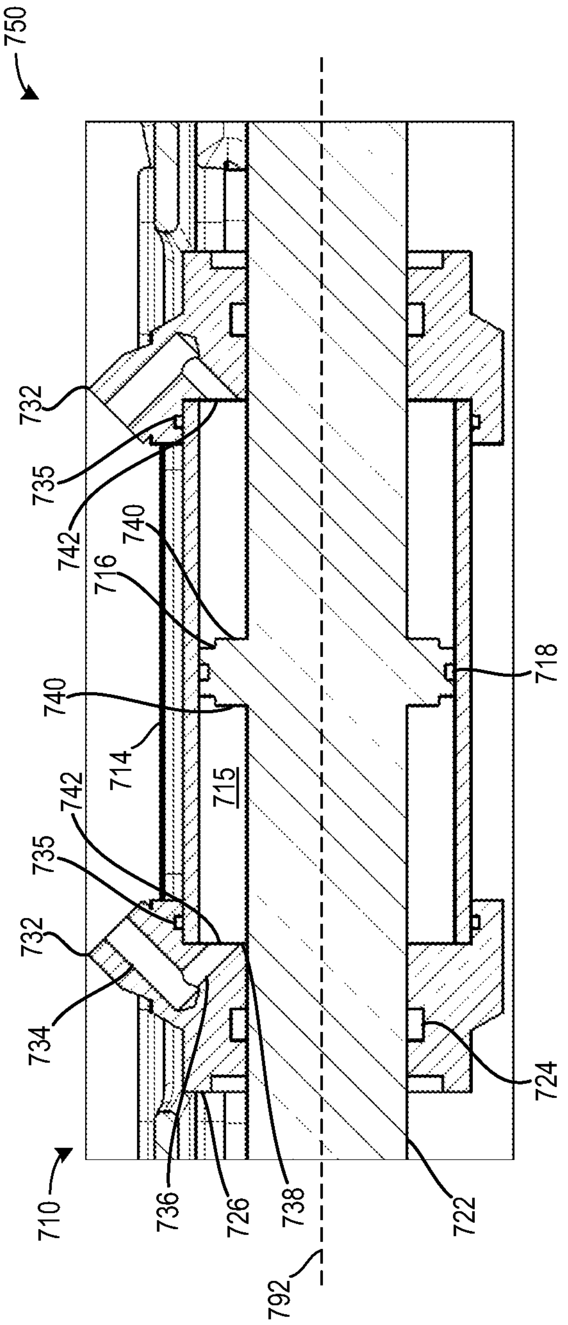
Figure 8:
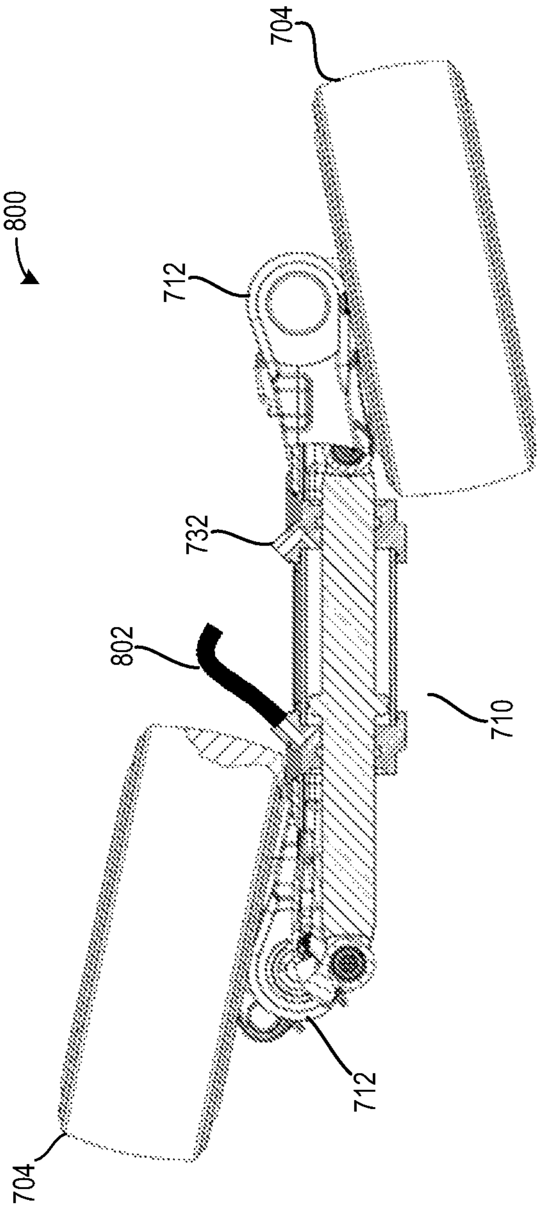
FIG. 8 is an example of a position of pair of wheels turned to a threshold degree relative to the pair of ports of FIGS. 7A and 7B, according to an embodiment of the present disclosure.
Figure 9:
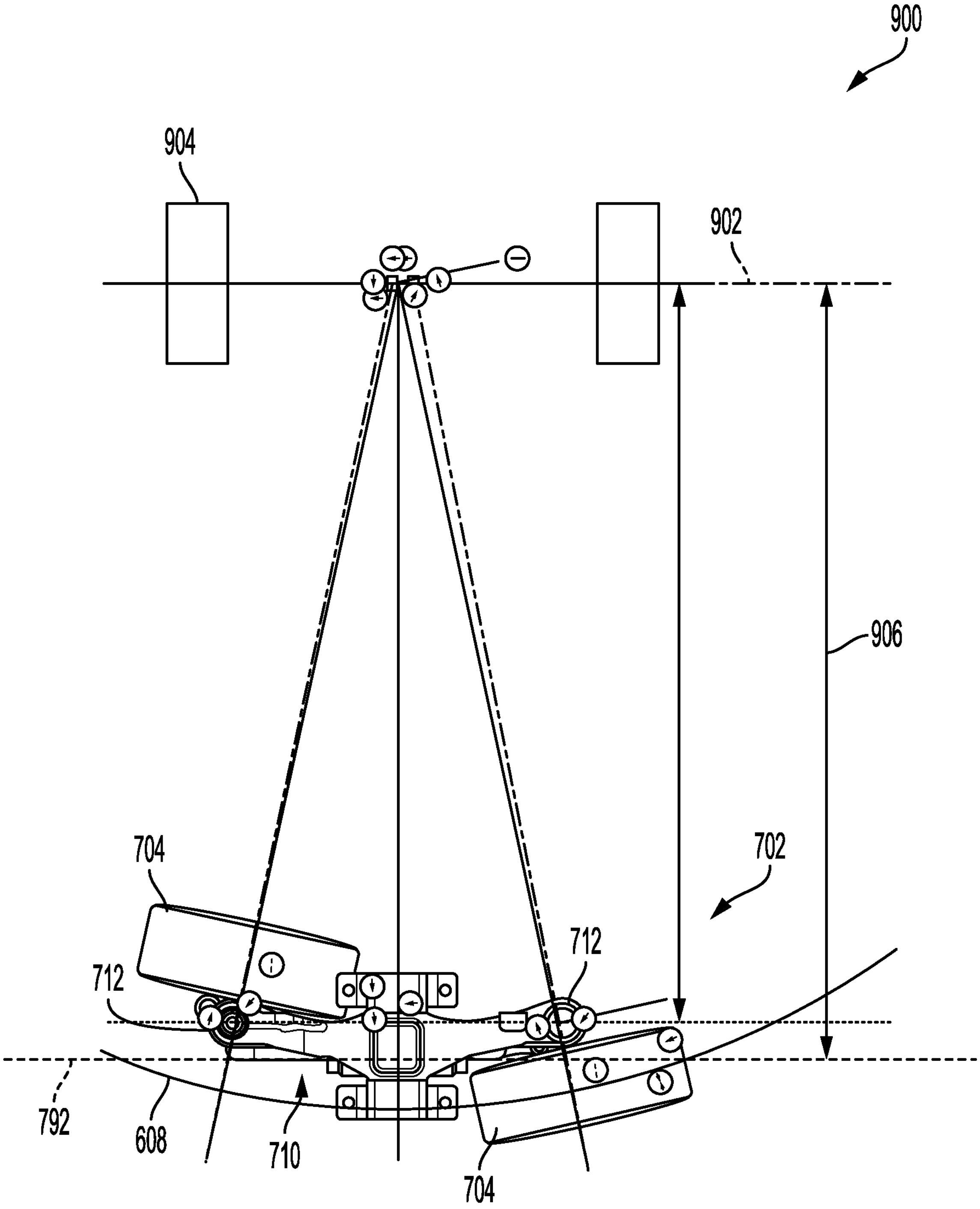
FIG. 9 is an example of a turning radius of the rear axle of the off-highway vehicle, according to an embodiment of the present disclosure.

The following description relates to a driveline of an off-highway vehicle. FIG. 1 is an example of a vehicle, according to an embodiment of the present disclosure. FIG. 2 is an example of an off-highway vehicle, according to an embodiment of the present disclosure. FIG. 3A is an example of a steering column of a steering system of the off-highway vehicle. FIG. 3B is a detailed example of a steering cylinder of the steering system of an off-highway vehicle. FIG. 4 is a cross-sectional view of the steering cylinder, according to an embodiment of the present disclosure. FIGS. 5A and 5B are prior art examples of a wheel interfering with a port of the steering cylinder and a hydraulic hose. FIG. 6 is an example of a turning radius of the prior art examples of a vehicle including the system of FIGS. 5A and 5B. FIGS. 7A and 7B are an example of a pair of ports of a steering cycling, according to an embodiment of the present disclosure. FIG. 8 is an example of a position of pair of wheels turned to a threshold degree relative to the pair of ports of FIGS. 7A and 7B, according to an embodiment of the present disclosure. FIG. 9 is an example of a turning radius of the rear axle of the off-highway vehicle, according to an embodiment of the present disclosure.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation). As used herein, the term "approximately" is construed to mean plus or minus five percent of the range unless otherwise specified. FIGS. 3B-8 are shown approximately to scale, however, other dimensions may be used if desired.

Turning now to FIG. 1, an off-highway vehicle 100 is shown. The off-highway vehicle 100 includes a powertrain 110. The powertrain 110 includes a prime mover 112 as a power source. The prime mover 112 is coupled to a transmission 114 via a drive shaft 116. The drive shaft 116 transfers power from the transmission 114 to a differential 118 arranged on a drive axle 102. The differential 118 may control power output to halves of the drive axle 102, each half coupled to one wheel of a pair of first wheels 104.

In one example, the prime mover 112 is an engine. In another example, additionally or alternatively, the prime mover 112 is an electric machine. The electric machine may be coupled to an inverter 124. The inverter 124 may be coupled to a battery. In some examples, additionally or alternatively, the off-highway vehicle 100 may include an engine and an electric machine.

In one example, the drive axle 102 is a front axle 102, wherein the off-highway vehicle 100 further includes a rear axle 106 coupled to a pair of second wheels 108. The rear axle 106 may be arranged at a second extreme end of the off-highway vehicle opposite a first extreme end at which the front axle 102 is arranged.

Turning now to FIG. 2, it shows an embodiment 200 of the off-highway vehicle 100. The off-highway vehicle 100 further comprises a vehicle chassis 210 to which the front axle 102 and the rear axle 106 are coupled. The powertrain (e.g., powertrain 110 of FIG. 1) may be coupled to the chassis 210.

In the embodiment 200 of the off-highway vehicle 100, forks 214 are arranged at a front end of the off-highway vehicle. As such, in the example of FIG. 2, the off-highway vehicle 100 is a forklift with a direction of forward travel parallel to arrow 290. The off-highway vehicle 100 may further include a steering wheel 212. The steering wheel 212 may be configured to control a rotation of the second pair of wheels 108.

Turning now to FIGS. 3A and 3B, they show a steering system of the off-highway vehicle 100. The steering system may include the steering wheel 212, a steering column 302, a metering unit 304, a hydraulic control valve 306, a hydraulic pump 308, and a steering cylinder 310. As such, components previously introduced may be similarly numbered in this figure and subsequent figures. In one example, the steering wheel 212 may actuate the steering column 302, which may provide an input to the metering unit 304. The metering unit 304 may transfer and/or modify the input received and signal to the hydraulic control valve 306 a desired turning direction and magnitude of turn. The hydraulic control valve 306 may adjust fluid received from the hydraulic pump 308, wherein the fluid is directed to the steering cylinder 310 and used to turn the pair of second wheels 108. In one example, the steering cylinder 310 may be coupled to a pair of steering knuckles 312, wherein each of the steering knuckles 312 is associated with a corresponding wheel of the pair of second wheels 108. In one example, one knuckle may actuate a first of the pair of second wheels 108 and the other knuckle may actuate a second of the pair of second wheels 108.

Figure 4A:
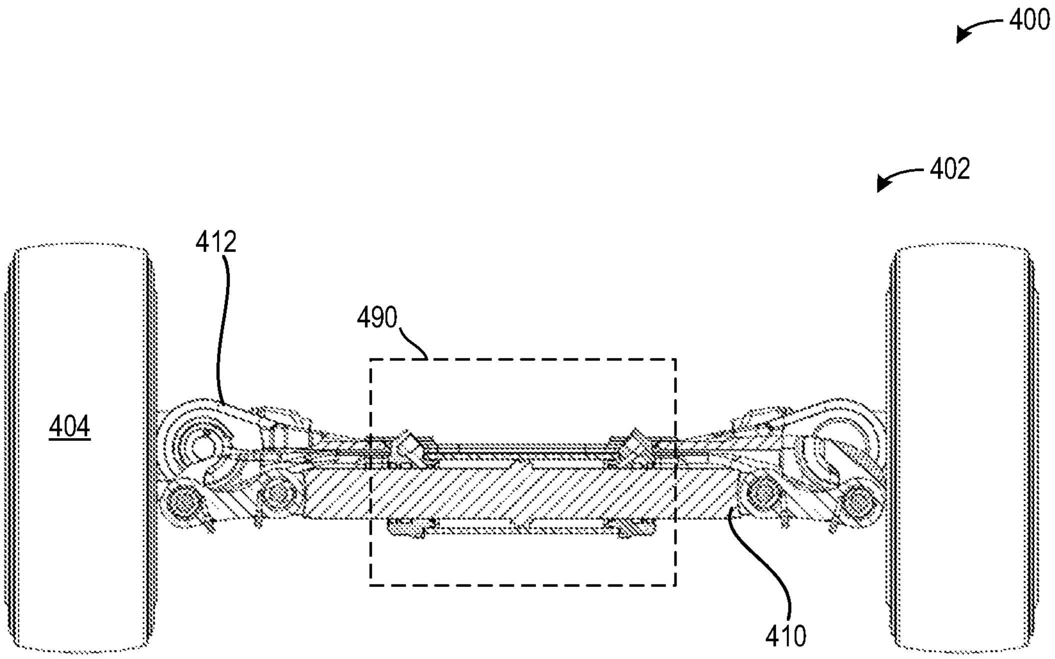
(Prior art) FIG. 4A
FIGS. 4A and 4B are views of a steering cylinder of a steering system of a prior art example.
Figure 4B:
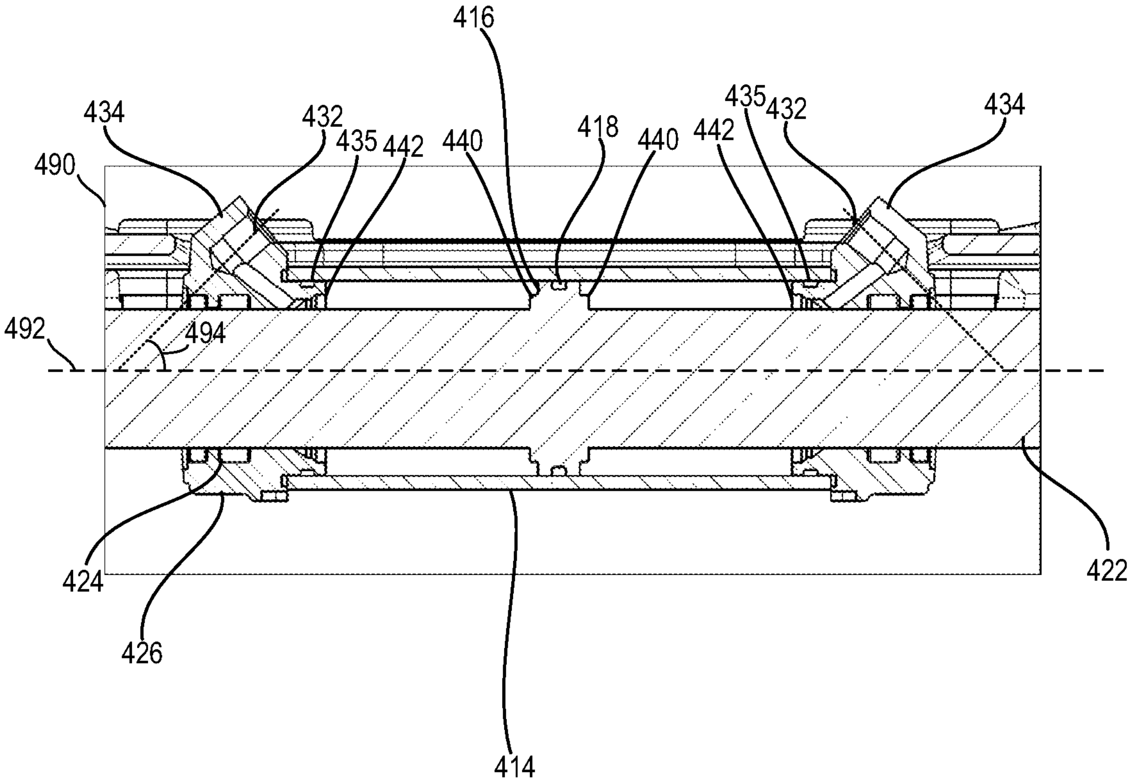
FIG. 4B (Prior art)

Turning now to FIGS. 4A and 4B, they show a prior art example 400 of a rear axle 402 and a steering cylinder 410. The steering cylinder 410 may include a pair of knuckles 412 that control actuation of a plurality of wheels 404. FIG. 4B shows a detailed view of the contents within dashed box 490 of FIG. 4A.

The steering cylinder 410 further includes a cylinder tube 414. In one example, the cylinder tube 414 is a housing. The cylinder tube 414 may include a piston 416 positioned therein. One or more seals 418 may be positioned about the piston 416 for retaining fluid within a desired area, such as a hydraulic chamber of the cylinder tube 414 through which the piston 416 oscillates. The piston 416 may be coupled to a piston rod 422. Piston rod seals 424 may be positioned at the extreme ends of the cylinder tube 414, in end caps 434.

A plurality of ports 432 may be positioned in end caps 434 of the cylinder tube 414 and configured to admit fluid from a hydraulic control valve (e.g., hydraulic control valve 306 of FIG. 3B) to an interior volume of the cylinder tube 414. In one example, the fluid is oil. Additionally or alternatively, the fluid may be water, an alcohol, a gas, or the like. The plurality of ports 432 admit fluid through and along an inner surface of the end caps 434 adjacent to the piston rod 422. That is to say, the plurality of ports 432 are fluidly coupled to a hydraulic chamber (e.g., interior volume of the cylinder tube 414) at an interface between the piston rod 422 and the end caps 434. The fluid may follow a length of the piston rod 422 inboard, away from the piston rod seals 424 and parallel to a central axis 492, to the interior volume. Passages of the ports 432 may align with the piston rod seals 424 along an axis normal to the central axis 492 of the piston rod 422. In one example, an outboard position of the plurality of ports 432 may result in a reduced turning radius of the wheels 404. The cylinder tube 414 and the end caps 434 are sealed with an O-ring 435 between the outer diameter of the end cap 434 and the internal diameter of the cylinder tube 414. The seal prevents leakage of fluid from the cylinder, the half stroke of the cylinder is determined as the distance between the piston face 440 and the end cap face 442.

An angle 494 at which the plurality of ports 432 are arranged may be measured relative to the central axis 492. The central axis 492 may be a central axis of the steering cylinder 410 and/or the rear axle 402. In one example, the central axis 492 is a central axis of the piston rod 422. In one example, the angle 494 is 55 degrees.

Turning now to FIG. 5A, it shows a prior art example 500 illustrating a first turning operation with the rear axle 402 of FIG. 4A and the steering cylinder 410 of FIG. 4B. As shown, with the plurality of ports 432 positioned at the angle 494, at least one of the plurality of wheels 404 may contact one of the plurality of ports 432 within a range of movement of the wheel. As such, the off-highway vehicle with the system of the prior art may have a larger turning radius and demand use a larger amount of space to navigate to a desired position, which may be disadvantageous to a user.

Turning now to FIG. 5B, it shows a prior art example 550 illustrating a steering system with a modified angle of the plurality of ports 532. As shown, the ports are normal to a central axis 590 of a steering cylinder 510. In the embodiment of FIG. 5B, a hydraulic hose 520 fluidly coupling the ports to the hydraulic control valve may interfere with and contact one of the wheels 502 within a range of movement of the wheel. This may reduce a lifespan of the hose and/or result in leaks.

Turning now to FIG. 6, it shows an embodiment 600 of a prior art example with dimensions of an off-highway vehicle when the wheels are steered to a maximum degree. In one example, the off-highway vehicle is a forklift. In one example, additionally or alternatively, the embodiment 600 includes the steering cylinder 410 and wheels 404. Due to the angle of the ports and the position of the hose, the wheel may be steered to a maximum degree of 98°. A turning radius 608 may be 1649.95 mm at a 98° steering angle. The wheelbase length 606 of the prior art forklift, measured from the central axis 492 to the front center axle 602, on which front wheels 604 are arranged, may be 1450 mm.

Turning now to FIGS. 7A and 7B, they show an embodiment 700 of a rear axle 702 according to an example of the present disclosure. FIGS. 7A and 7B are described in tandem herein. The rear axle 702 may include a steering cylinder 710, knuckles 712, and a pair of wheels 704 that may be actuated via the steering cylinder 710 and the knuckles 712.

FIG. 7B illustrates a detailed view 750 of the content within dashed box 790 of FIG. 7A, which corresponds to components of the steering cylinder 710. The steering cylinder 710 may include a piston 716 arranged in an interior volume 715 of a cylinder tube 714 of the steering cylinder 710. One or more seals 718 may be arranged between the piston 716 and an interior surface of the cylinder tube 714.

The piston 716 may be arranged on a piston rod 722. Rod seals 724 may be arranged within end caps 726, wherein the rod seals 724 and end caps 726 may be configured to retain fluid within the interior volume 715. A plurality of ports 732 may be fluidly coupled to the interior volume 715. The plurality of ports 732 are arranged on a side of the steering cylinder facing a direction of the front axle. In one example, the plurality of ports 732 may be positioned more inboard relative to the plurality of ports 432 of the prior art example shown in FIG. 4B. That is to say, the plurality of ports 732 may be further from the pair of wheels 704 relative to the plurality of ports 432 and the pair of wheels 404 of FIGS. 4A and 4B.

In one example, each of plurality of ports 732 may include a first passage 734 and a second passage 736. The first passage 734 may be fluidly coupled to a hose (e.g., hose 802 of FIG. 8). The first passage 734 may receive fluid from the hose and flow the fluid in a first direction. The first direction may be angled to an axis 792 about which the piston rod 722 and the piston 716 oscillate. The second passage 736 may receive fluid from the first passage 734 in a second direction, wherein the second direction is normal to the first direction and angled to the axis 792. The second passage 736 may expel fluid into the interior volume at a location spaced away from the piston rod 722 and the inner surface of the housing 714. As such, the first passage 734 is an inlet passage and the second passage 736 is an outlet passage. In one example, the second passage 736 expels fluids through a side wall 738 of an end cap of the end caps 726. The side wall 738 may be normal to one or more of the axis 792 and an interior surface of the housing 714. The cylinder tube 714 and the end caps 726 are sealed with an O-ring 735 between the inner diameter of the end cap 726 and the outer diameter of the cylinder tube 714. The seal prevents leakage of fluid from the cylinder, the half stroke of the cylinder is determined as the distance between the piston face 740 and the end cap face 742. In this arrangement, since the end cap face 742 is moved away from the piston, it allows the ports 732 to come closer to each other for the same value of half stroke as the prior art example of FIGS. 4A and 4B. The range of rotation is shown in greater detail in FIG. 8.

The plurality of ports 732 is arranged inboard relative to one or more rod seals 724 of the cylinder tube. Inboard and outboard relate to a direction along the axis 792 to and from wheels coupled thereto. Inboard is a direction away from the wheels and outboard is a direction to the wheels. A distance between adjacent ports of the plurality of ports is less than a length of the interior volume 715. In one example, a distance between each port of the plurality of ports 732 and a nearest wheel of the pair of wheels 704 may be a single fixed distance for each of the plurality of ports 732.

Turning now to FIG. 8, it shows an embodiment 800 of the pair of wheels 704 steered to a threshold steer angle. In one example, the threshold steer angle is a maximum of a steer angle range of the pair of wheels 704. The threshold steer angle is 102° in the example of FIG. 8. As shown, the wheels clear the ports and the hydraulic hose 802 at the threshold steer angle for a same steering input compared to the prior art example of FIG. 6. As such, an off-highway vehicle including the steering system comprising the rear axle 702 and the steering cylinder 710 of the present disclosure may decrease a turn radius and allow the off-highway vehicle to turn a greater amount within a smaller area compared to the prior art.

Turning now to FIG. 9, it shows an embodiment 900 of an off-highway vehicle according to an embodiment of the present disclosure. Due to the more inboard position of the pair of ports 732, the wheels may be turned to a larger threshold steer angle compared to the prior art example of FIG. 6. In one example, the rear wheels 704 are turned to 102° without contacting the ports and/or the hose. A turning radius 908 may be less than 1630 mm at the threshold steer angle. In one example, the turning radius 908 is 1621.95 mm. The wheelbase length 906 of the forklift of FIG. 9, measured from the axis 792 to the front center axle 902, on which front wheels 904 are arranged, may be 1450 mm.

In some examples, additionally or alternatively, the present disclosure provides support for a steering system comprising a steering cylinder housing a piston rod comprising a piston, the piston moveable through a hydraulic chamber coupled to a pair of ports, wherein the pair of ports are spaced from one another at a distance less than a length of the hydraulic chamber.

The disclosure provides support for a steering system including a hydraulic cylinder configured to adjust a steering angle of wheels coupled to an axle, and a pair of hydraulic ports, each including an inboard section in sealing engagement with an outer circumference of a cylinder tube. A first example of the steering system further includes where the steering system is included in a forklift vehicle. A second example of the steering system, optionally including the first example, further includes where the axle is a rear axle. A third example of the steering system, optionally including one or more of the previous examples, further includes where the pair of hydraulic ports do not extend into a hydraulic cylinder chamber in which a piston is arranged. A fourth example of the steering system, optionally including one or more of the previous examples, further includes where the pair of hydraulic ports are directly coupled to an interior volume of the cylinder tube spaced away from a piston rod coupled to a piston of the cylinder tube. A fifth example of the steering system, optionally including one or more of the previous examples, further includes where an axis parallel to a forward direction of travel of an off-highway vehicle comprising the steering system further comprises where the axis extends through a center of an opening of a port of the pair of hydraulic ports and through an interior volume of the cylinder tube. A sixth example of the steering system, optionally including one or more of the previous examples, further includes where a distance between openings of the pair of hydraulic ports is less than a length of an interior volume of the cylinder tube to which the pair of hydraulic ports are fluidly coupled. A seventh example of the steering system, optionally including one or more of the previous examples, further includes where each of the pair of hydraulic ports comprises a first passage and a second passage normal to the first passage, wherein the second passage directs hydraulic fluid to an interior volume of the cylinder tube.

The disclosure provides additional support for an off-highway vehicle including a steering system comprising a steering cylinder arranged a rear axle of the off-highway vehicle, wherein a valve is fluidly coupled to a plurality of ports of a cylinder tube of the steering cylinder via hoses, wherein the plurality of ports direct fluid to a region of an interior volume spaced away from a piston rod, the interior volume arranged in the cylinder tube. A first example of the off-highway vehicle further includes where each of the plurality of ports include an inlet passage and an outlet passage, the outlet passage fluidly coupled to the interior volume and angled to each of the inlet passage and the piston rod. A second example of the off-highway vehicle, optionally including the first example, further includes where a distance between adjacent ports of the plurality of ports is less than a length of the interior volume. A third example of the off-highway vehicle, optionally including one or more of the previous examples, further includes where the plurality of ports is arranged inboard relative to one or more rod seals of the cylinder tube. A fourth example of the off-highway vehicle, optionally including one or more of the previous examples, further includes where the steering cylinder adjusts a position of rear wheels coupled to the rear axle via a pair of knuckles. A fifth example of the off-highway vehicle, optionally including one or more of the previous examples, further includes where the off-highway vehicle is a forklift, and wherein a fork of the forklift is arranged at an opposite end of the off-highway vehicle relative to the rear axle. A sixth example of the off-highway vehicle, optionally including one or more of the previous examples, further includes where each of the plurality of ports is spaced by a single distance from a rear wheel of the rear axle.

The disclosure provides further support for a steering system including a steering column arranged adjacent to a front axle and coupled to a steering wheel, and a steering cylinder arranged on a rear axle and coupled to a hydraulic control valve via a pair of hydraulic lines, wherein a pair of ports of the steering cylinder are fluidly coupled to the pair of hydraulic lines and configured to flow fluid from the pair of hydraulic lines directly to a position of a hydraulic chamber away from a piston rod and a piston. A first example of the steering system further includes where the pair of ports include an outlet passage that is positioned in an end plate and terminate in a side wall of the end plate, the side wall normal to an axis about which the piston rod and the piston oscillate. A second example of the steering system, optionally including the first example, further includes where the end plate comprises a seal in face-sharing contact with the piston rod, and wherein the seal is outboard of each of the pair of ports. A third example of the steering system, optionally including one or more of the previous examples, further includes where the steering cylinder, in combination with steering knuckles, the steering column, and the steering wheel, is configured to rotate a pair of rear wheels 102° with a turning radius less than 1630 mm. A fourth example of the steering system, optionally including one or more of the previous examples, further includes where the pair of ports are arranged on a side of the steering cylinder facing a direction of the front axle.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A steering system, comprising:

a hydraulic cylinder configured to adjust a steering angle of wheels coupled to an axle, and a pair of hydraulic ports, each including an inboard section in sealing engagement with an outer circumference of a cylinder tube; and a pair of seals;

wherein each seal included in the pair of seals is positioned on an outer diameter of the cylinder tube and at an inboard location in relation to a face of an end cap;

wherein the inboard location refers to a direction away from a wheel along an axis on which a piston rod oscillates; and wherein the piston rod is coupled to a piston of the hydraulic cylinder.

2. The steering system of claim 1, wherein the steering system is included in a forklift vehicle.

3. The steering system of claim 1, wherein the axle is a rear axle.

4. The steering system of claim 1, wherein the face is normal to an axis about which a piston oscillates and wherein the piston is arranged in an interior volume of the cylinder tube.

5. The steering system of claim 1, wherein the pair of hydraulic ports are directly coupled to an interior volume of the cylinder tube that is spaced away from a piston rod that is coupled to a piston of the cylinder tube.

6. The steering system of claim 1, wherein an axis parallel to a forward direction of travel of an off-highway vehicle comprising the steering system further comprises where the axis extends through a center of an opening of a port of the pair of hydraulic ports and through an interior volume of the cylinder tube.

7. The steering system of claim 1, wherein a distance between openings of the pair of hydraulic ports is less than a length of an interior volume of the cylinder tube to which the pair of hydraulic ports are fluidly coupled.

8. The steering system of claim 1, wherein each of the pair of hydraulic ports comprises a first passage and a second passage normal to the first passage, wherein the second passage directs hydraulic fluid to an interior volume of the cylinder tube.

9. An off-highway vehicle, comprising:

a steering system comprising:

a steering cylinder arranged a rear axle of the off-highway vehicle, wherein a valve is fluidly coupled to a plurality of ports of a cylinder tube of the steering cylinder via hoses; and a pair of seals;

wherein each seal included in the pair of seals is positioned on an outer diameter of the cylinder tube and at an inboard location in relation to a face of an end cap;

wherein the plurality of ports each include an outlet passage that expels fluid through the face of the end cap; and wherein the plurality of ports direct fluid to a region of an interior volume spaced away from a piston rod, the interior volume arranged in the cylinder tube.

10. The off-highway vehicle of claim 9, wherein each of the plurality of ports include an inlet passage and the outlet passage is fluidly coupled to the interior volume and angled to each of the inlet passage and the piston rod.

11. The off-highway vehicle of claim 9, wherein a distance between adjacent ports of the plurality of ports is less than a length of the interior volume.

12. The off-highway vehicle of claim 9, wherein the face is normal to an axis about which a piston oscillates and wherein the piston is arranged in an interior volume of the cylinder tube.

13. The off-highway vehicle of claim 9, wherein the steering cylinder adjusts a position of rear wheels coupled to the rear axle via a pair of knuckles.

14. The off-highway vehicle of claim 9, wherein the off-highway vehicle is a forklift, and wherein a fork of the forklift is arranged at an opposite end of the off-highway vehicle relative to the rear axle.

15. The off-highway vehicle of claim 9, wherein each of the plurality of ports is spaced by a single distance from a rear wheel of the rear axle.

16. A steering system, comprising:

a steering column arranged adjacent to a front axle and coupled to a steering wheel; and a steering cylinder arranged on a rear axle and coupled to a hydraulic control valve via a pair of hydraulic lines, wherein:

a pair of ports of the steering cylinder are fluidly coupled to the pair of hydraulic lines and configured to flow fluid from the pair of hydraulic lines directly to a position of a hydraulic chamber away from a piston rod and a piston;

the pair of ports each include an outlet passage that is positioned in an end plate and terminate in a side wall of the end plate; and the side wall is arranged normal to an axis about which the piston rod and the piston oscillate.

17. The steering system of claim 16, wherein the end plate comprises a seal in face-sharing contact with the piston rod, and wherein the seal is outboard of each of the pair of ports.

18. The steering system of claim 16, wherein the steering cylinder, in combination with steering knuckles, the steering column, and the steering wheel, is configured to rotate a pair of rear wheels 102° with a turning radius less than 1630 mm.

19. The steering system of claim 16, wherein the pair of ports are arranged on a side of the steering cylinder facing a direction of the front axle.

* * * * *